United States Patent [19]

Lach

[11] Patent Number: 5,441,453

[45] Date of Patent: Aug. 15, 1995

[54] VIBRATING SHAFT ASSEMBLY HAVING MAGNETIC COMPENSATION FOR REDUCING SHAFT BEARING LOADS

[75] Inventor: Greg F. Lach, Dublin, Calif.

[73] Assignee: W.S. Tyler, Incorporated, Gastonia, N.C.

[21] Appl. No.: 71,240

[22] Filed: Jun. 3, 1993

[51] Int. Cl.⁶ ............................................. F16F 15/10
[52] U.S. Cl. .................................................... 464/180
[58] Field of Search .................. 464/29, 180, 185; 74/573 R; 29/901; 384/446

[56] References Cited

U.S. PATENT DOCUMENTS

| | | |
|---|---|---|
| 3,614,180 | 10/1971 | Beer et al. |
| 3,865,442 | 2/1975 | Studer. |
| 3,902,659 | 9/1975 | Brinkmann et al. ............. 74/573 R |
| 4,128,280 | 12/1978 | Purtschert. |
| 4,241,620 | 12/1980 | Pichl et al. ..................... 74/573 R |
| 4,334,718 | 6/1982 | Hirt et al. ........................... 464/180 |
| 4,406,642 | 9/1983 | McNall ............................... 464/180 |
| 4,728,837 | 3/1988 | Bhadra. |
| 4,895,551 | 1/1990 | Fritz ................................. 74/573 R |
| 4,933,583 | 6/1990 | Ripplinger ....................... 74/573 R |
| 4,983,869 | 1/1991 | Vaidya et al. |
| 5,111,102 | 5/1992 | Meeks. |
| 5,209,699 | 5/1993 | Hashimoto et al. ................. 464/29 |

FOREIGN PATENT DOCUMENTS 3433199 12/1986 Germany.
1362510 12/1987 U.S.S.R.

OTHER PUBLICATIONS

The American Society of Mechanical Engineers, Development of a Compact Light Weight Magnetic Bearing, Jun. 11–14, 1990.

Primary Examiner—Daniel P. Stodola
Assistant Examiner—Eileen A. Dunn
Attorney, Agent, or Firm—Donald L. Beeson

[57] ABSTRACT

A vibrating shaft assembly has a magnetic compensation system for its rotating shaft for reducing the dynamic loads on the shaft bearings. The magnetic support system includes a radially magnetized permanent arc magnet which has an outward facing magnetic pole face and which is circumferentially affixed to the heavy side of the shaft at least one axial location along the shaft; it also has a stationary magnet, such as a permanent ring magnet or an electromagnet, external to the shaft for providing a magnetic pole face that surrounds the shaft in opposition to and concentric with the pole face of the shaft's arc magnet. The opposing pole faces of the stationary magnet and the arc magnet are of the same magnetic polarity such that, as the shaft and thus the permanent magnet on the heavy side of the shaft rotates, a constant radial repelling force is exerted on the heavy side of the shaft which counteracts the centrifugal force produced by the shaft's unbalanced mass.

27 Claims, 4 Drawing Sheets

VIBRATING SHAFT ASSEMBLY HAVING MAGNETIC COMPENSATION FOR REDUCING SHAFT BEARING LOADS

BACKGROUND OF THE INVENTION

The present invention generally relates to vibrating machines; it more particularly relates to a system for reducing dynamic loads exerted on the bearings that support the vibrating shaft assembly of a vibrating machine. Vibrating equipment in which the invention might be employed include vibrating screens, compactors, vibrating feeders, conveyors, shakers, and the like.

Vibration machinery commonly employ rotating unbalanced shafts to generate vibrations that can be harnessed for a desired objective such as impelling aggregate material along a vibrating platform or separating aggregate through a vibrating screen. The unbalanced mass associated with the shaft, because it has a center of gravity that is different than the shaft's axis of rotation, produces a centrifugal force that generates useful vibrations as the shaft rotates. The degree of vibration produced will depend on the weight of the unbalanced mass, the distance that the mass center of gravity is offset from the shaft's rotational axis, and the angular velocity of the shaft.

As a result of the centrifugal force produced by the unbalanced shaft of a vibrating machine, the dynamic load on the bearings supporting the shaft will be increased as compared to a balanced shaft where no vibrational forces are produced. The bearings supporting a rotating unbalanced shaft will therefore experience greater stress, and this will in turn reduce bearing life and increase maintenance costs for a given size of bearing.

Heretofore, the problem of bearing life in a vibrating shaft assembly has been approached by selecting bearings that are large enough to withstand the extreme bearing loads involved. However, large bearings are relatively expensive and are limited in their speed range.

The present invention overcomes the problem of bearing loads in vibrating shaft assemblies by providing a means for counteracting the radial centrifugal forces transmitted to the shaft's support bearings. Indeed, it is contemplated that the invention will reduce bearing loads to the minimum allowed by bearing manufactures. The invention also provides a means for axially centering the shaft within the vibrating unit additionally reducing any associated axial bearing loads. The invention will permit the use of smaller bearings for a given vibrating shaft size and will reduce the substantial maintenance costs and down time associated with bearing replacement.

SUMMARY OF THE INVENTION

Briefly, the invention involves a magnetic compensation system for counteracting the centrifugal force produced by the unbalanced mass of a rotating shaft. It also provides for axially centering the shaft by configuring the magnetic system to produce axial magnetic force components that resist axial movement of the shaft.

The vibrating shaft assembly generally includes a shaft having an unbalanced mass and bearing means for rotatably supporting the shaft. Permanent magnetic means are provided on the heavy side of the shaft and rotates with the shaft while magnetic means external to the shaft are provided for producing a substantially constant magnetic repelling force on the shaft's permanent magnetic means as the shaft rotates. By maintaining a constant magnetic repelling force on the shaft's permanent magnetic means, and thus on the heavy side of the shaft, a constant inward radial force is produced on the shaft that counteracts the outward radial centrifugal force produced by the shaft's unbalanced mass.

Preferably, the permanent magnet means which rotates with the shaft is comprised of one or more radially magnetized arc magnet circumferentially affixed along the shaft on its heavy side.

The magnetic means which is external to the shaft is, in one illustrated embodiment of the invention, comprised of a radially magnetized ring magnet that co-axially surrounds the shaft at the location of the permanent arc magnet or the other permanent magnet means that rotates with the shaft. It is contemplated that a plurality of arc magnets will be positioned axially the shaft in opposition to a plurality of corresponding stationary ring magnets so that the shaft experiences a distributed repelling force over its entire length.

In another illustrated embodiment of the invention, the external magnet means is comprised of electromagnetic means that provides at least one magnetic pole face that co-axially surrounds the shaft at the location or locations of the shaft's permanent magnetic means. Preferably, the electromagnetic means includes, at each desired shaft location, a series of electromagnets having circumferentially adjacent U-shaped cores that surround the shaft. The U-shaped cores provide two axially displaced, inwardly facing, arcuate pole faces of opposite magnetic polarity that have a radius of curvature centered at the shaft's axis of rotation. In this embodiment, a permanent arc magnet or arc magnet segments are provided on the heavy side of the shaft at the location of each of the electromagnet's pole faces. The arc magnet at each shaft location is radially polarized to provide an outwardly facing, concentric magnetic pole face that corresponds in its magnetic polarity to the magnetic pole face of the electromagnetic core to which it is opposed. By axially offsetting the two axially spaced-apart arc magnets on the shaft slightly inwardly of the pole faces of the electromagnet, an axially centering force can be produced on the shaft.

The repelling magnetic forces exerted on the shaft will preferably be in line with the shaft's unbalanced mass, as would be the case of magnetic repelling forces distributed along an eccentric shaft. If the repelling magnetic forces occur at a position out of line with the unbalanced mass, such as would be the case if the magnetic means were located intermediate the unbalanced masses provided at the ends of the shaft, the shaft would have a tendency to deflect as a result of the magnetic repelling forces exerted upon it.

The invention also involves a method of reducing bearing loads produced by an unbalanced rotating shaft comprised essentially of a the steps of providing at least one magnetic pole on the heavy side of the unbalanced shaft such that the magnetic pole rotates with the shaft and permitting this magnet pole to rotate in opposition to a stationary magnetic pole surrounding the shaft so that a constant repelling force is produced on the shaft which counteracts the outward radial centrifugal force produced by the shaft's unbalanced mass.

Therefore, it can be seen that the primary object of the present invention is to reduce bearing loads on a rotating unbalanced shaft and to thereby extend the life of the bearings. It is another object of the invention to permit smaller support bearings to be used for a given shaft size. Other objects of the invention will be apparent to persons skilled in the art from the following specification and claims.

DETAILED DESCRIPTION OF THE ILLUSTRATED EMBODIMENT

Figure 1:
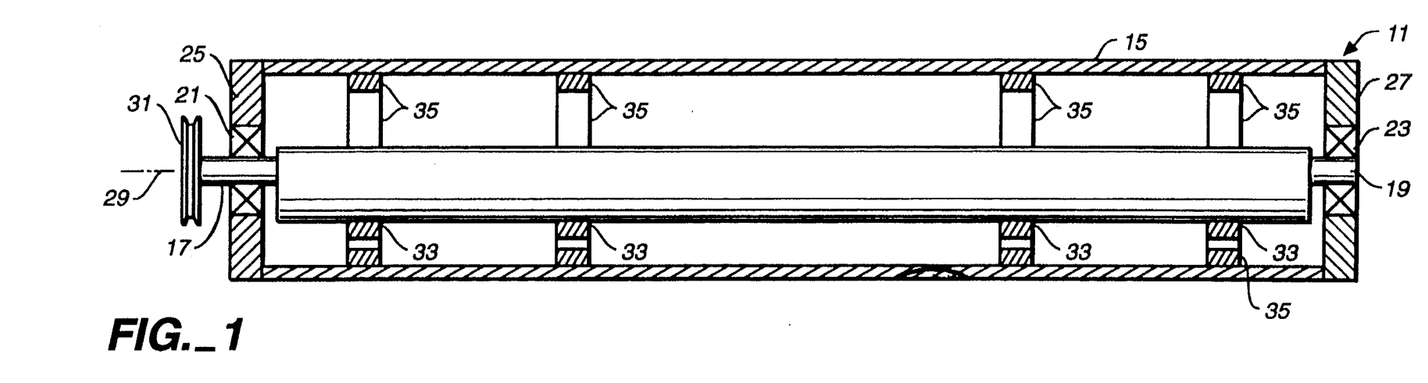
FIG. 1 is a side elevation, cross-sectional view of a vibrating shaft assembly having magnetic compensation in accordance with the invention, and particularly shows the use of ring magnets as the stationary magnets of the assembly's magnetic system.
Figure 2:
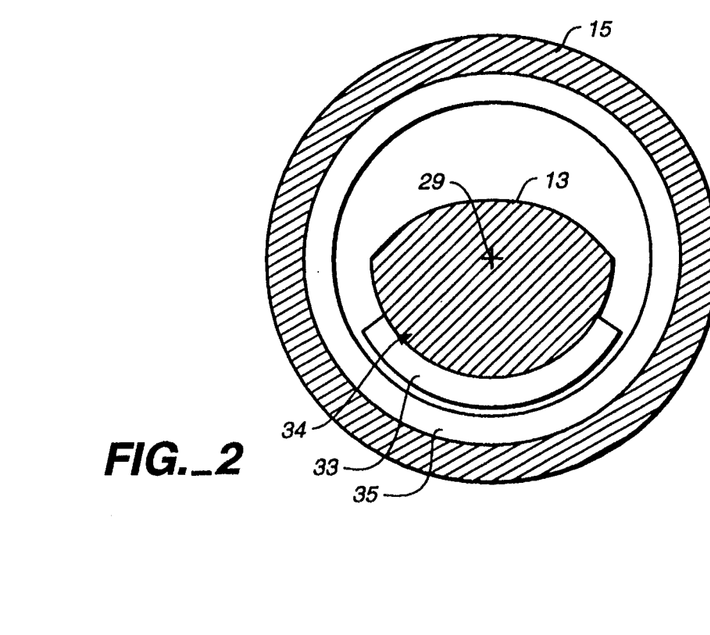
FIG. 2 is an enlarged end elevation, cross-sectional view of the vibrating shaft assembly of FIG. 1.
Figure 3:
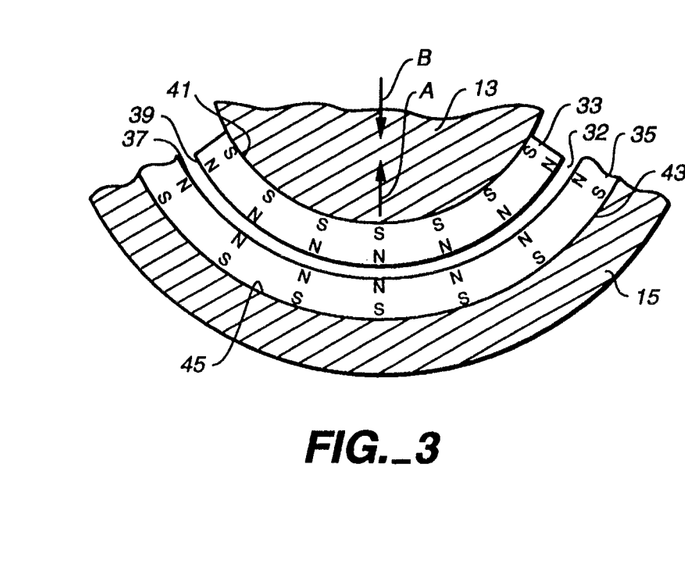
FIG. 3 is an enlarged fragmentary cross-sectional view of the vibrating shaft assembly of FIG. 1 showing the magnetic polarity characteristics of the shaft arc magnets and stationary ring magnets, and the corresponding vector forces.

Referring now to the drawings, FIGS. 1-3 show a vibrating shaft assembly 11 having an eccentric shaft 13 extending through cylindrical housing 15. The eccentric shaft ends 17, 19 are supported by shaft bearings 21, 23 held in the housing's end walls 25, 27. The eccentric shaft has an axis of rotation 29 and is externally driven by suitable drive means (not shown) which is operatively connected to the vibrating assembly through pulley wheel 31.

The magnetic compensation system for the eccentric shaft 13 includes permanent magnet means in the form of arc magnets 33 circumferentially affixed to the heavy side of the shaft which is indicated by numeral 34. The magnetic compensation system further includes magnetic means external to the shaft in the form of stationary ring magnets 35 which are located inside the housing in opposition to arc magnets 33. The corresponding arc and ring magnets are seen to be closely spaced concentric elements separated by a small gap 32, and are further seen to be positioned at shaft locations distributed between the shaft's bearing supported ends 17, 19.

The arc magnets 33 and ring magnets 35 are radially polarized to provide opposed concentric pole faces. Thus, it can be seen that the ring magnets provide a first magnetic means external to the shaft for providing inward facing magnetic pole faces 37 that substantially encircle the shaft at different axial locations along the shaft. The arc magnets, on the other hand, provide a second magnetic means for providing outward facing magnet pole faces 39 on the heavy side of the shaft which rotate with the shaft in opposition to the inward facing stationary magnetic pole faces 37 of the corresponding ring magnets. In accordance with the invention, the ring and arc magnets are radially magnetized such that their opposed concentric pole faces are of the same magnetic polarity so as to produce a constant repelling force on the heavy side of the shaft.

The arc and ring magnets described above should be suitably sized to produce a desired repelling force on the shaft. The magnitude of the repelling force will depend on the size and type of the magnets, the width of the gap 32 between the magnets' opposed pole faces 37, 39, and the number of magnets placed along the shaft. As hereinafter described in connection with the graph shown in FIG. 8, the magnitude of the repelling force will determine the shaft speed at which the bearing load is minimized. Thus, it will be seen that the design of the magnetic system for the shaft can in effect be tailored to the vibrating assembly's designed operating characteristics.

FIG. 3 shows in more detail the radial polarization characteristics of the arc magnets and stationary ring magnets of the vibrating shaft assembly illustrated in FIGS. 1 and 2. In this figure, arc magnet 33 is shown as being radially polarized such that its radially interior magnetic pole, that is, the pole at the pole face 41 contacting the shaft, is a south pole, and such that the outer magnetic pole at its outward facing pole face 39 is a north pole. Conversely, the radially exterior pole presented by the outer pole face 43 of the ring magnet, that is, the pole face contacting the interior cylindrical mounting wall 45 of the housing, is a south pole, whereas its interior pole at pole face 37 is a north pole. Thus, in FIG. 3, the magnetic north poles of the opposing ring and arc magnets are seen to face each other. The radial polarities of these two magnets, however, could just as well be reversed such that the opposing magnetic poles are south poles.

As shown in FIG. 3, the close proximity of the two like magnetic poles of the ring and arc magnets produces a radial and inward directed repelling force indicated by arrow A. This repelling force is opposite in direction to, and therefore counteracts, the centrifugal force produced by the heavy side of the shaft as indicated by arrow B.

Figure 4:
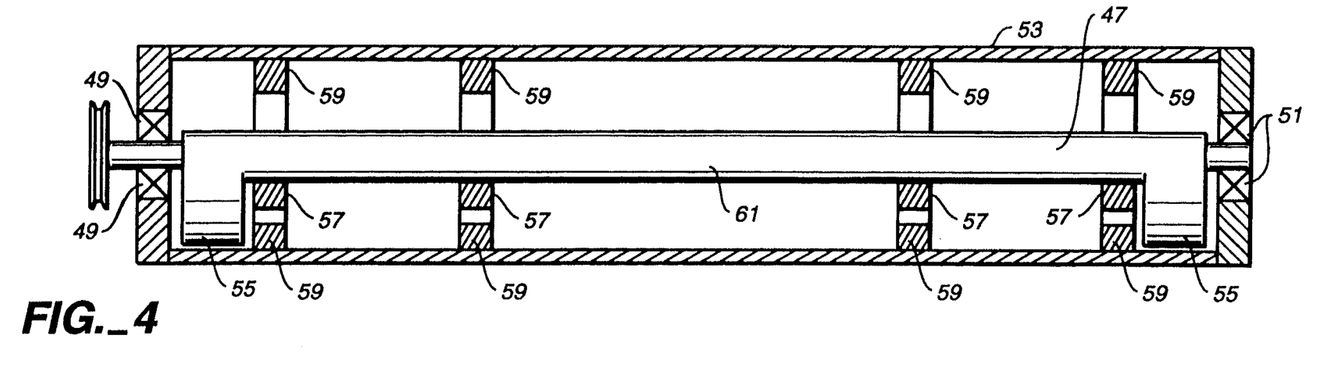
FIG. 4 is a side elevation, cross-sectional view of an alternative embodiment of a vibrating shaft assembly having a magnetic system in accordance with the invention wherein the elements of the magnetic system are located intermediate unbalanced masses at the ends of the shaft.

An alternative to the embodiment of the vibrating shaft assembly shown in FIGS. 1-3 is illustrated in FIG. 4 wherein a rotating shaft 47 supported by bearings 49, 51 in housing 53 has two discreet unbalanced masses 55 disposed internally of the housing at either end of the shaft. Arc magnets 57 and opposing ring magnets 59, which are of the same design described in connection with the FIGS. 1-3 embodiment, are disposed along the shaft intermediate the unbalanced masses. As in the previously described embodiment, the arc magnets are positioned on the heavy side 61 of shaft 47, that is, the side of the shaft from which the discreet unbalanced masses extend. Because the shaft has a smaller diameter at the location of the magnets, the embodiment of FIG. 4 may be useful in situations where more magnetic force and thus larger magnet sizes are desired. It is also understood that the unbalanced masses 55 could be located at other positions along the shaft, and that additional masses could be added. For example, an unbalanced mass could extend from the center of the shaft instead of or in addition to masses 55.

Figure 5:
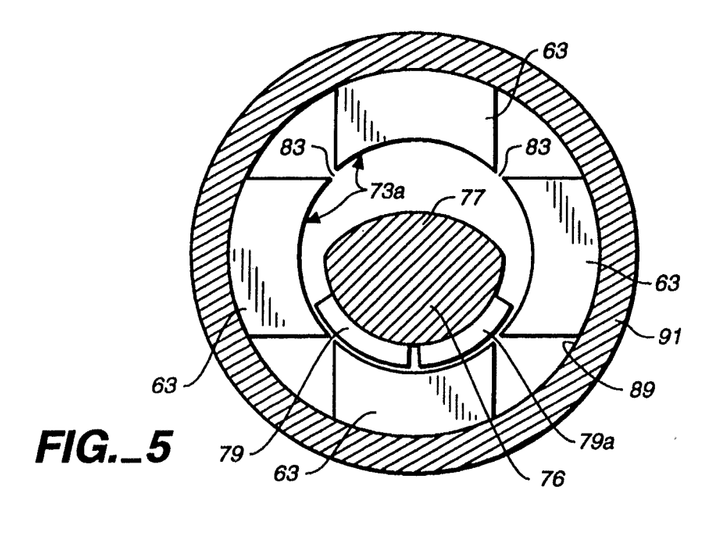
FIG. 5 is an end elevation, cross-sectional view of an alternative embodiment of the invention wherein the stationary magnetic means external to the shaft are comprised of electromagnets instead of permanent magnets.
Figure 6:
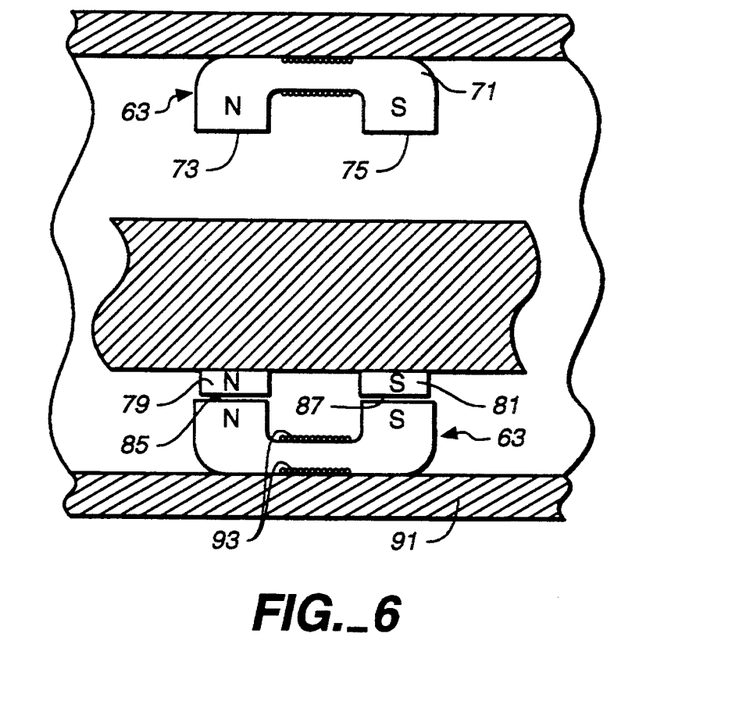
FIG. 6 is a fragmentary cross-sectional view in side elevation of the vibrating shaft assembly shown in FIG. 5.

FIGS. 5 and 6 illustrate the embodiment of the invention wherein the external stationary magnetic means attached to the housing is comprised of electromagnets instead of permanent ring magnets. In this embodiment, four identical electromagnets 63 are used at each shaft location where there is to be magnetic compensation. As best seen in FIG. 6, each electromagnet 63 includes a U-shaped core 71 that has a north and south pole at axially spaced-apart, inward facing arcuate pole faces 73, 75. The arcuate pole faces 73, 75 of the electromagnets each have a radius of curvature centered at the axis of rotation of the shaft 77; the pole faces of like magnetic polarity circumferentially align such that two substantially continuous, axially spaced apart pole faces of opposite magnetic polarities surrounds the shaft (see continuous pole face 73a in FIG. 5).

The permanent magnetic means on the heavy side 76 of shaft 77 in the FIGS. 5 and 6 embodiment are, like the previously described embodiments, in the form of arc magnets. In this case two axially adjacent arc magnets 79, 81 are used at each shaft location, one for each of the axially adjacent pole faces 73, 75 presented by each group of electromagnets. As shown in FIG. 5, each of the arc magnets actually consists of two circumferentially aligned arc magnet segments, such as segments 79, 79a, that extend a sufficient distance about the circumference of the shaft to overlap circumferentially adjacent pole faces of the opposing electromagnets. This overlapping configuration will mitigate the effects of the discontinuity in the magnetic field at the end gaps 83 between pole faces of like polarity.

Each of the axially spaced apart arc magnets 79, 81 in the FIGS. 5 and 6 embodiment will be radially polarized in opposite directions so as to provide outward facing magnetic poles in opposition to, and of the same polarity as, the inward facing magnetic pole faces of the electromagnets. Thus, referring to FIG. 6, the opposed magnetic pole faces 73, 85 of, respectively, the electromagnets and the arc magnet 79 are shown as being north poles whereas the opposing pole faces 75, 87 of, respectively, the same electromagnets and the axially adjacent arc magnet 81 are shown as being south poles. Both sets of opposing pole faces will therefore produce a repelling force against the shaft.

The electromagnets shown in FIGS. 5 and 6 are suitably secured to the interior surface 89 of housing 91 and have windings 93 driven from a suitable external power source (not shown). Preferably, the electromagnets and corresponding sets of arc magnets are provided at multiple locations along the shaft, such as shown in connection with the embodiment illustrated in FIG. 1. By distributing the magnetic force along the shaft, a distributed repelling force will be provided on the shaft that will minimize shaft deflections and that will produce force vectors that add together to counteract the shaft's centrifugal force. Also, the circumferential orientation of the axially adjacent electromagnets at each shaft location will preferably be rotated 45° in respect to axially adjacent sets of electromagnets so as to spread out the effect of perturbations in the magnetic field caused by the end gaps between the like polarity pole faces of the electromagnets.

Figure 7:
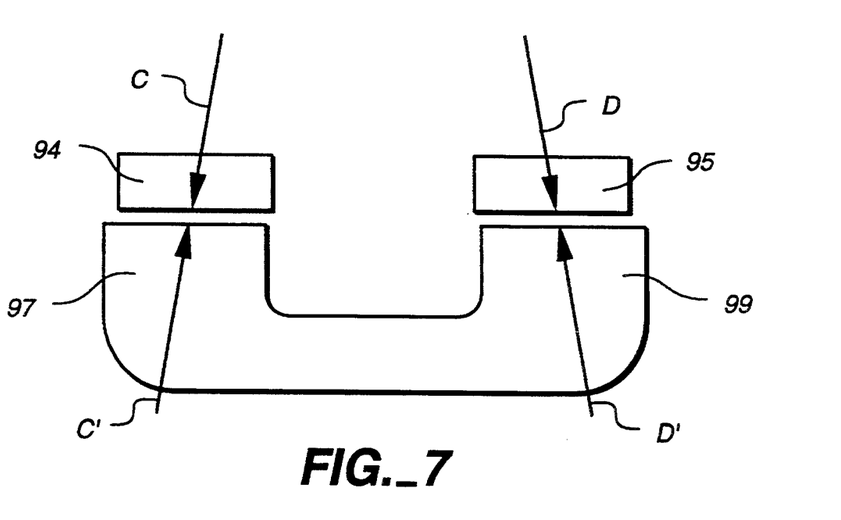
FIG. 7 is a pictorial view of the magnetic elements shown in FIGS. 5 and 6 illustrating the axial centering forces generated by offset magnetic pole faces.

FIG. 7 illustrates how the opposing pole faces of the permanent magnets and electromagnets of the FIGS. 5 and 6 embodiment can be offset to provide axial stability to the shaft and to reduce axial loads on the shaft bearings. As illustrated in FIG. 7, the permanent magnets 94, 95 are axially offset to the inside of the pole faces 97, 99 of the electromagnet such that the magnetic repelling forces at each of the opposing pole faces has an inward directed axial component, as shown by force vectors C,C' and D,D', that tends to center the permanent magnets between the poles of the electromagnet. Any axial deflection forces on the shaft will be counteracted by these magnetic centering forces, which will occur on the shaft at each shaft location where magnetic compensation is provided.

Axial centering of the shaft can similarly be provided in the FIG. 1 embodiment of the invention by axially offsetting adjacent arc magnet pairs on the shaft inwardly of their corresponding adjacent ring magnets.

Figure 8:
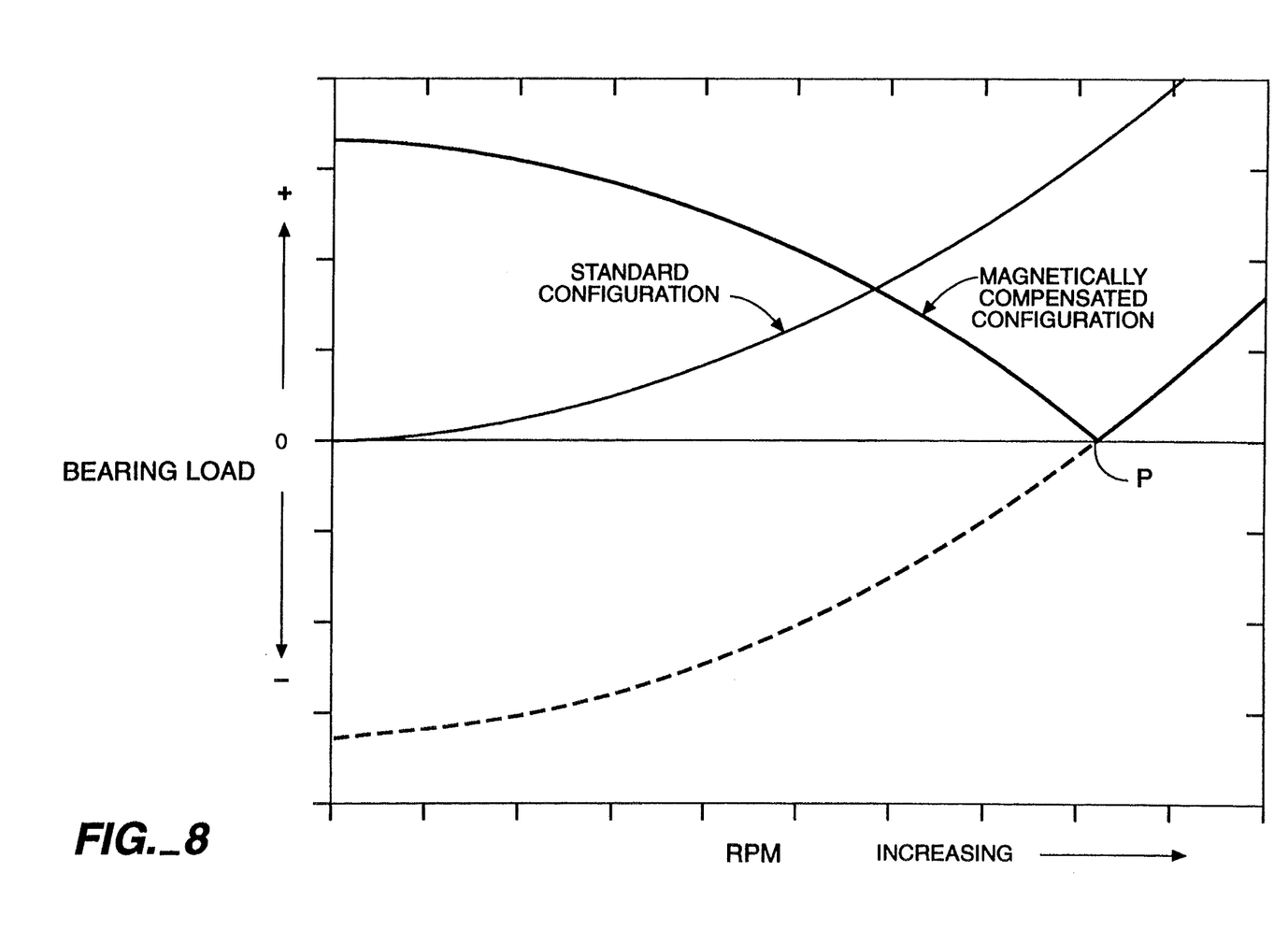
FIG. 8 is a graph illustrating the comparison of bearing loads as a function of shaft speed for a conventional vibrating shaft assembly and a shaft assembly using the magnetic compensation system of the invention.

FIG. 8 illustrates the bearing load characteristics of a vibrating assembly in accordance with the invention as compared to a standard vibrating assembly which does not have a magnetically compensated shaft. The horizontal axis of the FIG. 8 graph represents shaft speed in revolutions per minute and the vertical axis represents bearing load. The FIG. 8 graph is based on theoretical calculation and is representative of dynamic load conditions ignoring the static load produced by the weight of the shaft.

Referring to the graph of FIG. 8, it can be seen that centrifugal forces of a conventional bearing configuration increase monotonically with shaft speed thereby monotonically increasing the load on the bearings. In other words, the higher the shaft speed, the higher the bearing load. In contrast, the bearing load for a magnetically compensated bearing configuration made in accordance with the invention decreases with shaft speed until the centrifugal force of the shaft's unbalanced mass equals the additive repelling forces of the shaft's magnetic system, at which point the centrifugal force overcomes the magnetic repelling forces. Thus, in the hypothetical performance graph of FIG. 8, the bearing load is minimized (nominally zero) in a dynamic situation at crossover point P on the graph's horizontal axis. As the shaft speed increases beyond this optimum point, the net load on the shaft increases, but is less than the load for the standard bearing configuration.

As earlier discussed, the shaft speed at which minimum bearing load conditions occur can be changed by changing the size and configuration of the magnets. Using the electromagnetic version of the invention shown in FIGS. 5 and 6, the optimum shaft speed can also be varied by varying the current through the electromagnet core windings.

Referring to the performance curve for the magnetically compensated shaft of the invention, it should be noted that, before the crossover point is reached, the bearing load is actually negative as indicated by the dashed line extension of the curve. This simply indicates that the direction of the load has changed by 180 degrees as the centrifugal force increases to overcome the magnetic compensating forces.

Finally, in respect to optimum shaft speeds, bearing manufacturers normally recommend that bearings be used in non-zero load conditions in order to prevent the bearing rollers from "skidding" on the roller journals. Thus, the optimum shaft speed would not necessarily occur at the crossover point on the graph, but at a point near the crossover point that provides a minimum positive load.

Therefore, it can be seen that the present invention provides for a magnetic compensation system for a vibrating shaft that reduces bearing loads, extends bearing life, and permits the use of smaller bearings for a given shaft size. It is understood that the scope of the invention is not intended to be limited by the embodiments illustrated and described herein, except as necessitated by the appended claims. It is particularly understood that numerous embodiments of a vibrating shaft assembly in accordance with the invention are possible, including a wide variety of housing configurations and means for attaching the shaft bearings directly or indirectly to the housing. Similarly, numerous different vibrating shaft designs are possible, including vibrating shafts that have their unbalanced mass external to the housing. Other versions of the magnetic compensation system are also possible. For example, the ring magnets disposed externally of the shaft could be a series of circumferentially adjacent arc magnets forming a ring, instead of the continuous ring magnet illustrated and described herein. Other variations of the illustrated embodiment falling within the spirit and scope of the invention will be apparent to persons skilled in the art in light of the foregoing specification.

What I claim is:

1. A vibrating shaft assembly having a magnetic compensation system for reducing bearing loads comprising
    a shaft having an unbalanced mass which provides a heavy side to the shaft,
    bearing means for rotatably supporting said shaft,
    at least one permanent magnet disposed on the heavy side of said shaft so as to rotate therewith,
    magnetic means external to said shaft for producing a magnetic repelling force on said permanent magnet whereby as said shaft rotates an inward radial force is produced thereon which opposes the outward radial centrifugal force created by the rotation of said unbalanced mass, said external magnetic means being disposed such that said inward radial force counteracts the centrifugal for acting on said bearing means.

2. The vibrating shaft assembly of claim 1 wherein said permanent magnet is comprised of at least one radially magnetized arc magnet circumferentially affixed to the heavy side of said shaft.

3. The vibrating shaft assembly of claim 2 wherein a plurality of said arc magnets are positioned at different axial locations along said shaft.

4. The vibrating shaft assembly of claim 1 wherein said external magnetic means includes at least one electromagnet.

5. The vibrating shaft assembly of claim 1 wherein said external magnetic means is comprised of at least one radially magnetized permanent ring magnet supported to coaxially surround said shaft at the axial location of said permanent magnet means.

6. The vibrating shaft assembly of claim 1 wherein the magnetic repelling force produced by said external magnetic means includes an axial force component for reducing axial bearing loads.

7. The vibrating shaft assembly of claim 1 wherein the magnetic repelling force produced by said external magnetic means on said permanent magnet is radially in line with the centrifugal force vector of the unbalanced mass of said shaft.

8. A vibrating shaft assembly having a magnetic compensation system for reducing bearing loads comprising
    a shaft having an unbalanced mass which provides a heavy side to said shaft,
    bearing means for rotatably supporting said shaft,
    first magnetic means external to said shaft for providing at least one inward facing magnetic pole face that substantially encircles said shaft at at least one shaft location, and
    second magnetic means on said shaft for providing at least one outward facing magnetic pole face on the heavy side of said shaft which rotates with said shaft in opposition to the inward facing magnetic pole face of said first magnetic means, the opposed magnetic pole faces of said first and second magnetic means being of the same polarity such that a repelling magnetic force is constantly exerted on the heavy, side of said shaft as said shaft rotates, said second magnetic means being disposed such that the repelling magnetic force exerted on the heavy side of the shaft counteracts the centrifugal force acting on said bearing means.

9. The vibrating shaft assembly of claim 8 wherein said first and second magnetic means provide opposed magnetic pole faces at multiple shaft locations.

10. The vibrating shaft assembly of claim 8 wherein said first and second magnetic means are radially magnetized permanent magnets.

11. The vibrating shaft assembly of claim 8 wherein said first magnetic means is a radially magnetized permanent ring magnet supported to coaxially surround said shaft, and wherein said second magnetic means is a radially magnetized permanent arc magnet circumferentially affixed to the heavy side of said shaft in opposition to said ring magnet.

12. The vibrating shaft assembly of claim 11 wherein said shaft is an eccentric shaft for providing an unbalanced mass.

13. The vibrating shaft assembly of claim 8 wherein said first magnetic means is comprised of at least one electromagnet.

14. The vibrating shaft assembly of claim 13 wherein
    said electromagnet includes a U-shaped core having two axially spaced apart, inward facing, arcuate pole faces of opposite magnetic polarity, the radius of curvature of each of said arcuate pole faces being centered at the axis of rotation of said shaft, and
    said second magnetic means is comprised of a pair of radially magnetized permanent arc magnets circumferentially affixed to said shaft in opposition to the inward facing pole faces of the core of said electromagnet, said pair of arc magnets providing two outward facing pole faces which are of opposite magnetic polarity so as to correspond to the opposite magnetic polarity of the electromagnet core pole faces opposed thereto.

15. The vibrating shaft assembly of claim 14 wherein a plurality of electromagnets are provided at different axial locations along said shaft, and wherein at each shaft location said electromagnets have circumferentially adjacent U-shaped cores for providing substantially continuous arcuate pole faces that encircle said shaft at said different shaft locations.

16. The vibrating shaft assembly of claim 15 wherein at each shaft location four U-shaped cores are provided, one for each quadrant of the rotation of the arc magnet pairs on said shaft.

17. The vibrating shaft assembly of claim 14 wherein each arc magnet of said arc magnet pair is comprised of at least two end to end arc magnet segments.

18. A vibrating shaft assembly having a magnetic compensation system for reducing bearing loads comprising a stationary housing, a shaft having an unbalanced mass which provides a heavy side to said shaft, bearing means mounted to said housing for rotatably supporting said shaft therein, first magnetic means mounted within and secured to said housing for providing an inward facing magnetic pole that substantially encircles said shaft at least one shaft location, and second magnetic means on said shaft for providing an outward facing magnetic pole on the heavy side of said shaft and which rotates with said shaft in opposition to the inward facing magnetic pole of said first magnetic means, the opposed magnetic poles of said first and second magnetic means being of the same polarity such that a repelling magnetic force is constantly exerted on the heavy side of said shaft as said shaft rotates within said housing.

19. The vibrating shaft assembly of claim 18 wherein said housing is a cylindrical housing.

20. The vibrating shaft assembly of claim 18 wherein said first and second magnetic means provide opposed magnetic poles at multiple shaft locations within said housing.

21. The vibrating shaft assembly of claim 20 wherein the opposed magnetic poles at least two shaft locations are axially offset to provide opposed axial force components for axially centering said shaft.

22. The vibrating shaft assembly of claim 18 wherein said first and second magnetic means are radially magnetized permanent magnets.

23. The vibrating shaft assembly of claim 18 wherein said first magnetic means is comprised of electromagnetic means secured to said housing.

24. A method for reducing the bearing loads produced by a rotating shaft having a heavy side for unbalancing the shaft, said method comprised essentially of the steps of providing at least one magnetic pole on the heavy side of a rotating unbalanced shaft which rotates with said shaft, and permitting the magnetic pole on said shaft to rotate in opposition to a stationary magnetic pole surrounding said shaft of the same magnetic polarity so as to produce a constant repelling force on said shag which opposes the outward radial centrifugal force produced by the heavy side of said shaft, said stationary magnetic pole being disposed such that the repelling magnetic force exerted on the heavy side of the shaft counteracts the centrifugal force acting on said bearing means.

25. The method of claim 24 wherein multiple magnetic poles are distributed along the heavy side of said shaft at multiple shaft locations, and wherein said magnetic poles are permitted to rotate in opposition to corresponding stationary magnetic poles surrounding said shaft at multiple shaft locations.

26. The method of claim 25 wherein the constant repelling force produced by said stationary magnetic poles have an axial component for axially centering said shaft.

27. The method of claim 24 wherein magnetic means for providing said rotating and stationary magnetic poles are selected to produce a repelling force of a strength that is optimized to a desired rotation speed of said shaft.

* * * * *

UNITED STATES PATENT AND TRADEMARK OFFICE
CERTIFICATE OF CORRECTION

PATENT NO. : 5,441,453

DATED : August 15, 1995

INVENTOR(S) : Greg F. Lach

It is certified that error appears in the above-identified patent and that said Letters Patent is hereby corrected as shown below:

Column 7, claim 1, line 38, after the word "centrifugal" insert the word "force"

Column 8, claim 8, line 13, delete "," after "heavy".

Column 10, claim 24, line 14, delete "shag" and insert therefor --shaft--.

Signed and Sealed this

Twenty-fourth Day of October, 1995

*Attest:*

BRUCE LEHMAN

*Attesting Officer*     Commissioner of Patents and Trademarks